United States Patent [19]
Motroni et al.

[11] Patent Number: 5,496,912
[45] Date of Patent: Mar. 5, 1996

[54] THERMOTROPIC LIQUID CRYSTAL AROMATIC POLYSTERS

[75] Inventors: Giuseppe Motroni, Verbania; Mauro Maritano, Novara; Alfredo Coassolo, Novara; Giovanni Giunchi, Novara, all of Italy

[73] Assignee: Himont Italia S.r.l., Italy

[21] Appl. No.: 435,275

[22] Filed: May 5, 1995

Related U.S. Application Data

[63] Continuation of Ser. No. 326,811, Oct. 20, 1994, abandoned, which is a continuation of Ser. No. 170,506, Dec. 20, 1993, abandoned, which is a continuation of Ser. No. 912,553, Jul. 13, 1992, abandoned.

[51] Int. Cl.$^6$ .................................................. C08G 63/02
[52] U.S. Cl. ..................... 528/193; 528/176; 528/272; 428/1; 428/357; 428/480
[58] Field of Search .................................. 528/176, 193, 528/272; 428/1, 357, 480

[56] References Cited

U.S. PATENT DOCUMENTS 4,529,565  7/1985  Kasatani et al. .................... 264/211.12

FOREIGN PATENT DOCUMENTS 0323126  7/1989  European Pat. Off. .
59-030821  2/1984  Japan .

Primary Examiner—James J. Seidleck
Assistant Examiner—Terressa M. Mosley
Attorney, Agent, or Firm—Bryan Cave

[57] ABSTRACT

Thermotropic melt processable liquid crystalline aromatic polyesters comprising units derived from a dicarboxylic acid and from a mixture of aromatic diols in which from 50% to 80% is (1-phenylethyl)hydroquinone and from 20% to 50% is hydroquinone.

4 Claims, No Drawings

THERMOTROPIC LIQUID CRYSTAL AROMATIC POLYESTERS

This is a continuation of U.S. application Ser. No. 08/326,811, filed Oct. 20, 1994 now abandoned, which is a continuation of 08/170,506, filed Dec. 20, 1993, now abandoned, which is a continuation of U.S. application Ser. No. 07/912,553, filed Jul. 13, 1992, now abandoned.

TECHNICAL FIELD

The present invention relates to thermotropic liquid crystalline aromatic polyesters, easily melt processable and having the mesogen group in the main chain.

BACKGROUND OF THE INVENTION

Thermotropic polyesters, exhibiting therefore optical anisotropy in the melt phase, are well known products and broadly described in literature, e.g. in British Polymer Journal (Dec. 1980, p. 154, "Liquid Crystal Polymer"); Journal of Macromolecular Science (1984, p.1705, "Liquid Crystalline aromatic polyesters"); Die Angewandte Makromolecular Chemie (19–82, 109–110, p.1, "Rigid Chain Polymer;")

By extruding such polyesters in the molten state, high tenacity fibres and moulded articles with outstanding stiffness, toughness and strength are obtainable.

Polymers with the above cited properties are generally easily melt processable and show high heat and oxidation resistance; furthermore, due to their crystallinity, also the HDT (Heat Distortion Temperature) and the resistance to solvents of such polymers is high.

Thermotropic liquid crystalline polyesters with the above mentioned characteristics and suitable for producing fibres or films are described in U.S. Pat. No. 4,447,593. Such polyesters are obtained by polymerizing aromatic bicarboxylic acids with aromatic diols, the 90% of which are hydroquinones substituted with an alkyl group having at least 5 atoms of carbon or aralkyl group having at least 7 atoms of carbon.

The applicant is acquainted with other prior art documents in which aromatic bicarboxylic acids are used together with hydroquinones or variously substituted hydroquinones.

European Patent Application No. 295,892 refers to thermotropic liquid crystalline polymers in which the units of aromatic diols are phenylhydroquinone and α-methylphenylethylhydroquinone.

European Patent Application No. 320,298 refers to thermotropic liquid crystalline polymers in which the units of aromatic diols are (1-phenylethyl)hydroquinone and α-methylphenylethyl-hydroquinone.

U.S. Pat. No. 4,668,760 refers to thermotropic liquid crystalline polymers in which the units of aromatic diols are phenyl-hydroquinone and (1-phenylethyl)-hydroquinone.

U.S. Pat. No. 4,614,791 refers to liquid crystalline polymers in which the units of aromatic diols are (1-phenylethyl)hydroquinone and hydroquinone. Hydroquinone units are in mole percentage of from 16% and 18% of the total content of aromatic diols. In such document it is maintained that when the mole percentage of (1-phenylethyl)hydroquinone (based on the total moles of the reacting bicarboxylic acid and diols) is less than 41%–42%, an intractable material is formed.

U.S. Pat. No. 4,360,658 refers to copolyesters in which aromatic diols are constituted from 25% to 50% of hydroquinone and from 50% to 75% of phenylhydroquinone.

DESCRIPTION

The applicant has now found out that it is possible to produce thermotropic liquid crystalline polyesters, easily melt processable, by using a mixture of aromatic diols in which from 50% to 80% is a substituted hydroquinone and from to 50% is hydroquinone.

Object of the present invention are therefore thermotropic liquid crystalline polyesters comprising:

a) units derived from at least one aromatic bicarboxylic acid in a mole percentage of 50% with respect to the total mole amount;

b) units derived from a substituted hydroquinone

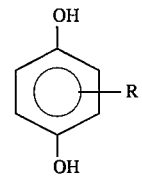

where R is one of the following groups: (1-phenylethyl), (1-methyl-1-phenylethyl), benzyl, benzoyl, phenoxy, or mixture thereof, optionally substituted, in a mole percentage of from 25% to 40% with respect to the total mole amount (c) units derived from hydroquinone in a mole percentage of from 10% to 25% with respect to the total mole amount.

As substituted hydroquinone, (1-phenylethyl)hydroquinone or (1-methyl-1-phenylethyl)hydroquinone is preferred. Particularly preferred is (1-phenylethyl)hydroquinone. When the benzoyl or phenoxy hydroquinone is used, a liquid crystal polymer is obtained which has a very good heat resistance.

In spite of the lower content of (1-phenylethyl)hydroquinone, and in contrast to what suggested by the prior art, a good processability of the polymer is obtained.

According to a preferred embodiment the aromatic bicarboxylic acid is present in at least a mole percentage of 90% in an isomeric form in which the carboxylic groups-aromatic rings bonds are parallel or coaxial to each other.

Examples of bicarboxylic acids are terephthalic acid; chloro, bromo-terephthalic acid; methylterephthalic acid; 1,4-, 1,5-, 2,6-naphtalendicarboxylic acid; 4,4'-diphenyldicarboxylic acid; 3,3'-dibromo-4,4'-diphenyldicarboxylic acid; etc. Terephthalic acid is preferred.

As hereinbefore said, units (a) derived from bicarboxylic acids are in equimolar ratio with respect to the units (b) and (c) derived from diols. With respect to the totality of the diol moles, the units derived from (1-phenylethyl)hydroquinone are in a mole percentage of from 50% to 80%, while the units derived from hydroquinone are from 20% to 50%.

According to a preferred embodiment of the invention, the units derived from (1-phenylethyl)hydroquinone are in a mole percentage of from 55% to 75%, while the units derived from hydroquinone are from 25% to 45%.

The polymers according to the present invention exhibit optical anisotropy in the melt state, as verifiable by optical microscopy analysis with polarized light. The melting temperature (Tm) can vary according to the composition and the degree of polymerization of the polymer; in general such temperature is from 300° C. to 350° C.

The molecular weight and the crystallinity can be increased by heating the polymer particles, under inert gas or under vacuum, at a temperature just below the melting point, for a period from 1 to 20 hours.

The aromatic polyesters object of the present invention are suitable of being used for producing moulded articles, according to the conventional processing techniques of thermoplastic polymers such as injection moulding or extrusion, for producing films or fibres, as matrix for composite materials containing reinforcing fibres (for instance glass, carbon, stainless steel fibres) and/or inorganic fillers and they can be used, even as fibre, in a mixture with other polymers. The resin according to the present invention may be extruded through a die plate by using the usual melt spinning process. The fibres so obtained have high mechanical properties and may be used also as reinforcing fibres in composite materials.

The preparation of the liquid crystalline polymers of the present invention is carried out according to the traditional polymerization techniques wherein the monomers, commercially available or produced by common organic synthesis, react under the known conditions of polyester resins preparation. For instance such polyesters can be obtained in the melt phase or in presence of a dispersant media having high boiling point (e.g. diphenylsulphone or partially hydrogenated terphenyl mixtures), via transesterification between aromatic bicarboxylic acid and the acetic and propionic esters of phenols, at a temperature of from 270° C. to 370° C., in order to facilitate the complete evolution of aliphatic carboxylic acids, also under vacuum.

The reaction is also optionally carried out in presence of a transesterification catalyst, such as, e.g., phosphates of alkaline or alkaline-earth metals. Further catalysts are those normally employed in polycondensation processes and cited in "Encyclopedia of Polymer Science and Technology" (1969, Vol. 10, p. 722–723).

Examples of such catalyst are Li, Na, K, Mg, Ca, Ti, Mn, Co, Zn, Sn, Sb, La, Ce, Pb, and Ge oxide, hydroxide, hydride, halide, alcoholate or phenolate, salts and complex salts of organic and inorganic acids. The amount of catalyst required is from 0,005% and 1%, preferably from 0,01% and 0,2%, with respect to the total mole amount of reactants.

The preparation of the liquid crystalline polymers of the present invention can be also carried out with an alternative method, according to which the polyester is obtained via polycondensation of aromatic bicarboxylic acid halides with the mixture of phenols in a suitable solvent. The temperature is from 25° C. to 220° C. and the reaction is carried out in presence of a base and/or a nitrogen flow to facilitate the elimination of hydrohalogenic acid. Among the bases, pyridine is preferred, whilst among the solvents, either aliphatic or aromatic solvents are particularly preferred such methylene chloride, chlorobenzene, di- and trichlorobenzene. The polymer is then recovered by evaporation of the solvent or by precipitation in a non-solvent with subsequent filtration.

For a better comprehension of the present invention and for its practical exploitation, some illustrative examples are given hereinafter, which can not be considered as limitative of the scope of the invention.

EXAMPLE 1

Into a 250 ml 4-neck round-bottom flask, equipped with a magnetic stirrer, cooler and inlet tube for nitrogen, there was charged under light $N_2$ flow 7.887 g (38.79 mM) of terephthalic acid dichloride, 5.812 g (27.15 mM) of (1-phenylethyl)hydroquinone, 1.280 g (11.63 mM) of hydroquinone and 143 ml of 1,2,4-trichlorobenzene.

The mixture is stirred under $N_2$ flow for 20' at room temperature, and then is heated up to 220° C. The mixture is maintained at this temperature for 12 hours, until the evolvement of hydrochloric acid has stopped. Always under $N_2$ flow and stirring the mixture is allowed to cool down. When the reaction mixture is at 50° C., the gelatinous mass is poured in acetone and the precipitate is filtered.

The polymer so obtained is washed with acetone (2 times), warm water (2 times) and acetone/methanol (2 times). The final product is then dried under vacuum for 3 hours at about 180° C. The molten polymer exhibits optical anisotropy at the polarized light microscope.

The polymer is subsequently annealed under the following conditions:

1 hour at 150° C.

2 hours at 230° C.

2 hours at 260° C.

2 hours at 280° C.

After annealing the polymer has a Tm of 331° C. and is insoluble in a mixture of phenol/trichlorobenzene (50:50 vol.) at 85° C. with a concentration of 0,25 g/dl.

EXAMPLES 2–4

According to example 1, other polyesters with different (1-phenylethyl)hydroquinone/hydroquinone concentration ratio are prepared.

The amount of reactants and the characteristics of polyesters are shown in the following table. All these polyesters are optically anisotropic at the polarized light microscope.

| | | | | After annealing | |
|---|---|---|---|---|---|
| | | moles | | Inherent viscosity | Melting Temperature |
| Example | (a) | (b) | (c) | (dl/g) | Tm (°C.) |
| 2 | 1 | 0.75 | 0.25 | 1.71 | 335 |
| 3 | 1 | 0.60 | 0.40 | insoluble | 313 |
| 4 | 1 | 0.55 | 0.45 | insoluble | 310 |

(a) = terephthalic acid chloride
(b) = (1-phenylethyl)hydroquinone
(c) = hydroquinone The melting temperature is determined by D.S.C. (Differential Scanning Calorimetry) with a scanning rate of 20° C./min.

EXAMPLE 5

Into a 100 ml 4-neck round-bottom flask, equipped with a magnetic stirrer, inlet tube for nitrogen, thermometer and still there was charged under light $N_2$ flow 14.00 g (84.27 mM) of terephthalic acid, 13.54 g (63.20 mM) of (1-phenylethyl)hydroquinone, 2.32 g (21.08 mM) of hydroquinone and 20.52 g (201 mM) of acetic anhydride. Under stirring and light $N_2$ flow, the reacting mixture is heated up to 140° C. by means of a silicon oil bath. This temperature is maintained for 1 hour and then acetic acid is distilled.

Subsequently the polymerization starts according to the following thermal profile:

30' at 240° C.

30' at 260° C.

1 h at 280° C.
1 h at 300° C.
1 h at 320° C.
30' at 340° C.

The mixture is heated furthermore for 15' at 340° C. under vacuum of about 1 mbar. Afterwards it is allowed to cool down always under light $N_2$ flow and the obtained solid mass is ground. The final product is dried under vacuum for 3 hours at 180° C.

The polymer analyzed with a polarized light microscopy provided with heating plate is optically anisotropic in the melt phase.

The polymer is subsequently annealed under $N_2$ flow according to the following conditions:

1 h at 150° C.
2 h at 230° C.
2 h at 260° C.
2 h at 290° C.

After annealing the polymer has a Tm of 335° C. and is insoluble in a mixture phenol/trichlorobenzene (50:50) at 85° C. with a concentration of 0.25 g/dl.

EXAMPLE 6

According to example 5, a polyester is prepared in which the (1-phenylethyl)hydroquinone/hydroquinone ratio is 60/40. After annealing the polymer has a Tm of 305° C. and is insoluble in a mixture phenol/trichlorobenzene (50:50) at 85° C. with a concentration of 0.25 g/dl.

EXAMPLE 7

In a 20 l steel reactor equipped with anchor stirrer, distillation column, bottom valve and nitrogen inlet, there was charged under light $N_2$ flow:

| (1-phenylethyl)hydroquinone | 3.813 Kg (17.80 moles) |
|---|---|
| hydroquinone | 0.840 Kg (7.63 moles) |
| terephthalic acid | 4.224 Kg (25.42 moles) |
| acetic anhydride | 5.970 Kg (58.48 moles) |

The mixture is heated at reflux up to 135° C. for 1 hour under stirring and $N_2$ atmosphere. Afterwards the temperature is slowly increased up to 250° C. and 3.500 l of acetic acid are distilled.

Subsequently the temperature is increased according to the following profile: from 250° C. to 270° C. in 20', from 270° C. to 290° C. in 1 h, from 290° C. to 300° C. in 20', and from 300° C. to 300° C. in 30'.

Starting from 310° C., vacuum is gradually applied, so to reach the value of 1 mbar at 330° C.; the mixture is maintained in this conditions for 15'. Further 3.100 l of acetic acid are distilled. Through the bottom valve 7.410 Kg of polymer are discharged, applying a light $N_2$ pressure. The polymer is ground in a hammer mill provided with a 2 mm grid. the polymer is then treated in a 20 l rotating reactor, under$_2$ flow of 300 Nl/h, according to the following temperature profile:

| 150° C. | 2 h |
|---|---|
| 250° C. | 2 h |
| 260° C. | 2 h |
| 270° C. | 2 h |
| 280° C. | 24 h |

The polymer so treated has a Tm of 325° C., is insoluble in a mixture phenol/trichlorobenzene (50:50) at 85° C. with a concentration of 0.25 g/dl, and a melt flow index of 7.18 g/10' according to ASTMD-1238 standard at 350° with a nozzle having a length/diameter ratio of 24,5 mm/2,096 mm and a load of 200 g.

EXAMPLE 8

The polymer of Example 7 was filled with 30% of silanized glass fibre type E (diam. 9.5 μm, length 3.2 mm) and granulated by means of a twin screw extruder. The pre-dried granules were then fed into the injecting press (mould temperature about 100° C.) and moulded with a rotating rate of the screw of 250 turns/min, obtaining test pieces according to ASTM standard for the characterization of plastic materials.

The results of mechanical characterization provided the following values:

| Tensile strength | MPa | 142 | ASTM D638 |
|---|---|---|---|
| Elongation at break | % | 1,1 | " |
| Tensile modulus | GPa | 17,9 | " |
| Flexural strength | MPa | 206 | ASTM D790 |
| Flexural modulus | GPa | 15,1 | " |
| Impact strength with | | | |
| Unnotched specimen | J/m | 317 | ASTM D256 |
| Notched specimen | J/m | 90 | " |
| Heat deflection temperature (HDT) | °C. | 255 | ASTM D648 |
| Heat deflection temperature (HDT) after annealing[1] | °C. | 290 | " |

[1] 5 h at 280° C. under nitrogen

EXAMPLE 9

In order to prepare a carbon fibre reinforced polymer, the polymer of Example 7 was mixed with 30% by weigth chopped carbon fibres FORTAFIL® 3 (cm) sizing 18—6.54 mm length—7.5 μm diameter, produced by AKZO.

The test samples were prepared according to the same procedure of Example 8.

The following data relate to the mechanical properties of the reinforced polymer:

| Tensile Strength | MPa | 146 | ASTM-D638 |
|---|---|---|---|
| Elongation | % | 0,98 | ASTM-D638 |
| Tensile Modulus | GPa | 25,45 | ASTM-D638 |
| Flexural Strength | MPa | 205 | ASTM-D790 |
| Flexural Modulus | GPa | 18,85 | ASTM-D790 |
| Unnotched Izod Impact | J/m | 343 | ASTM-D256 |
| Notched Izod Impact | J/m | 140 | ASTM-D256 |
| HDT | °C. | 243 | ASTM-D648 |

EXAMPLE 10

In the same reactor of example 7 the following compounds were charged:

(1-methyl-1-phenylethyl)hydroquinone 5,072 kg (22,22 moles)

hydroquinone 0,815 kg (7,41 moles)

terephthalic acid 4,921 kg (29,63 moles)

acetic anhydride 6,960 kg (6.8,15 moles)

After the acetilation reaction has been carried out, the temperature is increased according to the following profile: from 250° C. to 270° C. in 35', from 270° C. to 310° C. in 2 h, from 310° C. to 330° C. in 30'; starting from 310° C., vacuum is gradually applied in order to reach 1 mbar at 330° C. and to maintain such conditions for 15'. The amount of polymer obtained is 8,830 kg. The grounded polymer is then treated under $N_2$ flow according to the following temperature profile:

| 150° C. | 2 h |
| 250° C. | 2 h |
| 275° C. | 2 h |

The so treated polymer presents a melting temperature of 306° C., a glass transition temperature of 197° C.; it is insoluble in a mixture phenol/trichlorobenzene (50/50 vol) at 85° C. with a concentration of 0,25 g/dl and it has a Melt Flow Index of 8,62 g/10' at 350° C.

We claim:

1. A process for making molded articles, films and fibers, said process comprising melt processing a thermotropic liquid crystalline polyester comprising:
   a) units derived from at least one aromatic bicarboxylic acid in a mole percentage of 50% with respect to the total mole amount;
   b) units derived from a substituted hydroquinone

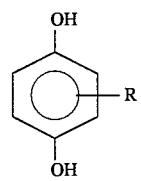

where R is selected from the group consisting of (1-phenylethyl), (1-methyl-1-phenylethyl), benzyl, benzoyl, phenoxy, and mixtures thereof, optionally substituted, in a mole percentage of from 37.5% to 40% with respect to the total mole amount;
   c) units derived from hydroquinone in a mole percentage of from 10% to 12.5 % with respect to the total mole amount.

2. The process of claim 1, wherein the substituted hydroquinone is selected from the group consisting of (1-phenylethyl)hydroquinone or (1-methyl-1-phenylethyl)hydroquinone or mixtures thereof.

3. The process of claim 1, wherein the aromatic bicarboxylic acid is present in at least a mole percentage of 90% in an isomeric form in which the carboxylic groups-aromatic ring bonds are parallel or coaxial to each other.

4. The process of claim 1, wherein the bicarboxylic acid is selected from the group consisting of terephthalic acid, chloro, bromo-terephthalic acid, methylterephthalic acid, 1,4-, 1,5-, 2,6-naphtalendicarboxylic acid, 4,4'-diphenyldicarboxylic acid, 3,3'-dibromo-4,4'- diphenyldicarboxylic acid and mixtures thereof.

* * * * *